United States Patent [19]
Wilson

[11] 3,942,268
[45] Mar. 9, 1976

[54] METHODS AND APPARATUS FOR INTERACTIVE COMMUNICATIONS

[75] Inventor: Stewart W. Wilson, Concord, Mass.

[73] Assignee: Polaroid Corporation, Cambridge, Mass.

[22] Filed: Oct. 2, 1972

[21] Appl. No.: 294,487

[52] U.S. Cl.................... 35/8 A; 35/9 R; 35/35 A; 35/36
[51] Int. Cl.² ........................................ G09B 5/06
[58] Field of Search.......... 35/35 C, 36, 6, 8 R, 8 A, 35/9 R, 9 A, 9 B, 9 E, 48 R; 40/28.1, 28.3; 206/DIG. 20; 360/62, 74, 79, 91; 178/DIG. 35

[56] References Cited
UNITED STATES PATENTS

| | | | |
|---|---|---|---|
| 3,255,536 | 6/1966 | Livingston | 35/9 A |
| 3,416,242 | 12/1968 | Nisbet | 35/48 R |
| 3,425,140 | 2/1969 | Dillon et al. | 35/36 |
| 3,538,626 | 11/1970 | Frank | 35/48 R |
| 3,558,142 | 1/1971 | Poessel | 35/35 C X |
| 3,582,956 | 6/1971 | Huston et al. | 346/33 MC |
| 3,662,121 | 5/1972 | Cruger | 35/35 C X |
| 3,668,648 | 6/1972 | Yoshikawa | 35/8 R X |

OTHER PUBLICATIONS

Land, E.H., and Wilson, S.W.; "Education And The Need To Know"; *Technology Review*; Alumni Association of M.I.T., Jan. 1967, pp. 29–36.
"Patentability–Utility"; U.S. Department of Commerce, Patent Office Academy; 1966; Section 7B1, pp. 1–4.
"Methods for Teaching Military Instructors"; U.S. Army Engineer School; 1958; Section I.G. 003–1, pp. 11,13.

*Primary Examiner*—Anton O. Oechsle
*Assistant Examiner*—Vance Y. Hum
*Attorney, Agent, or Firm*—John W. Ericson

[57] ABSTRACT

A method of communication, and apparatus for communication, in which a user is provided with a set of recordings, a device for reproducing the recordings, and a map comprising indicia correlating the recordings so that the recordings from the set may be reproduced in a sequence determined by the user.

16 Claims, 9 Drawing Figures

METHODS AND APPARATUS FOR INTERACTIVE COMMUNICATIONS

This invention relates to communication, and particularly to novel methods and apparatus for interactive communication.

Communication takes place most readily between two individuals in personal conversation. The reactions of each party to the conversation direct the other in an interactive manner which develops a framework of common meaning in which ideas can be exchanged. The farther communication departs from this direct process, the less certain it is that understanding will occur.

A particular application of the arts of communication in which it is not usually possible to use direct conversation as a tool is to the field of education. Group methods, with more or less individual participation, and independent study, necessarily supplant the tutorial method for the bulk of the educational process.

In order to make the best use of the time of gifted and talented teachers, for the most part they find themselves lecturing to large groups with a minimum of class participation. Very large groups can be instructed by such persons with the aid of telecommunication methods, such as television and the like, with the result that there is no direct interaction between the student and the teacher. Such methods have the advantage that they bring to a great many people the talents of a very few individuals.

In similar groups, more individual participation is possible. And a particular advantage of the instruction of smaller classes is that each student can obtain the advantages of the reactions of other students to the material as it is presented, and thus achieve an extended set of associations with the concepts under discussion.

All of the commonly used educational methods, including the tutorial process, have one characteristic in common that may serve as a barrier to the individual student; the path through the material is selected by the teacher. The student is guided along the selected path more or less passively, with interruptions from time to time to test his comprehension of the preceding subject matter so that, if necessary, it can be repeated or amplified.

In attempts to extend the capabilities of teachers by mechanizing their methods, teaching machines have been devised which proceed in a fixed program with interruptions for testing. Then, in response to the correct or incorrect reactions of the student, the machine either repeats or goes forward. Branching systems have been developed in which the same testing approach is used, and the presentation is branched at each test point to supplymentary material, or to additional material, in accordance with the responses of the student.

All of the approaches just discussed have certain advantages, but perhaps it might be postulated that the ideal educational process would be one in which a student had the full time attention of a gifted professor, at times of the student's choosing, and in which the student could control the educational process by interrupting the professor at any time for as long as he liked, with the freedom to ask any question that came to mind and thus direct the professor's discourse in directions that were personally relevant and important to the student. In that way, the student might ultimately cover all of the ground in a given area of study by traveling paths of his own choosing. Practical devices to achieve this end would most appropriately be called "learning machines" in preference to "teaching machines", because of the emphasis in the process just described on learner, in contrast to teacher, direction. As further ideals, it would be best if the student could also have the advantages of the reactions of others to the presentation of the same discourse, and could always receive, in response to a question, a carefully considered answer. Of course, these ideals are not directly attainable, because a student cannot fully occupy large amounts of a professor's time and, further, could not do so and also obtain the reactions of others. And even the most gifted professor will seldom answer a question spontaneously in just the way that he would if he had the opportunity to think about it, to analyze the reasons for the question, and to assemble the answer in such a form that it would be most clearly responsive to the particular question asked by the particular student.

Among the objects of my invention are to provide an educational process through which a student can obtain a satisfying approximation to a conversation with an expert person on a topic of mutual interest in which the student has the largest possible measure of individual control, through which it is possible to bring the talents of gifted teachers to individuals under conditions of their own choosing, in which the student is benefited by the insights of other students in their reactions to the same subject matter, and in which the student may ask questions and very quickly receive responses which have been carefully prepared in advance, and yet are spontaneously delivered.

Briefly, the above and other objects of my invention are attained by a communication process in which a selected topic is addressed by an authority, and preferably by a noted authority with a warm and responsive personality who is a competent teacher. The first step in the process is to prepare a recorded lecture on the selected subject, in which some effort is made to cover the topic fairly comprehensively, but at the same time in an organized and directed manner that will be intrinsically interesting and even entertaining.

This lecture may be of any selected length, from a few minutes to several hours, but should be such that it could be listened to attentively, all the way through, and stand on its own as a good representative treatment of the subject matter. Of course, it is not possible to cover any subject completely in this way, as a full understanding of a subject requires tautology and digression beyond the scope of an ordered presentation.

Next, the recorded lecture so prepared is presented to a number of listeners, and preferably to a group of students interested in the topic under discussion. They are asked to listen individually to the lecture, and to jot down comments or questions that occur to them as they listen.

It may be that such comments or questions, when collected and analyzed, will dictate modifications in the basic lecture that will improve it, and such can clearly be made by editing. However, it will usually be found that the questions, if responsively answered, will result in digressions from the main theme, or in an expounding of a point from an entirely different point of view that would have been diverting to the theme of the main lecture.

It might be thought that such an empirical process would tend to produce an endless series of questions, each of little interest except to the particular questioner at the particular time. However, I have found that one tends to collect a relatively well bounded set of questions in response to a particular lecture that are each either asked fairly frequently, or, if suggested to students, tend to be welcomed as also appropriate even though it might not occur to a given individual to ask the question himself. It is because of thee manageability and appropriateness of the set of questions obtained by this empirical process that my invention succeeds as a practical and satisfying approximation to a direct conversation.

The lecturer then carefully prepares answers to the selected questions, and these are recorded, in the most probable asking sequence, on a series of recordings, such as tape recordings or the like. Questions, other than those asked in the process of testing the lecture for questions, may also be included, such as questions that it might occur to the lecturer would be appropriate to bring out answers that he feels would be useful in amplifying a particular point, or in presenting the material from another point of view.

Preferably, in the process of recording both questions and answers, the lecturer is given the facility of accompanying his remarks with graphic illustrations such as sketches, a topic outline of points that he is covering, graphs, or the like, much as a professor would use a blackboard in the classroom. For this purpose, various visual aids may be employed, such as photographs, video recordings and the like, but I prefer to make use of a graphic recorder, such as the Electrowriter made and sold by the Victor Comptometer Corporation of Chicago, Illinois, as an adjunct to the lecturer's voice.

To prepare graphic recordings, the professor is provided with a transmitter including a pen and a roll of paper on which he can write. The transmitter produces signals reflecting the instantaneous position of the pen as he does so.

These signals are recorded along with the teacher's remarks, as on an adjacent track on the same tape. A receiver is provided consisting of a graphic recorder that responds to such signals by reproducing the writing as the signals appear. I have found that such graphic recording is an especially effective adjunct to recorded aural material, in that it develops a topic expounded by the lecturer in a dynamic and effective way, without intruding the personality of the lecturer directly into the situation so that the student retains control.

When recordings of lecture and answer material have been assembled in the manner described, they may be presented to a student in the form of a first set of cassettes, containing magnetic tape on which the lecture material is recorded, and a second set of cassettes containing the answer material. The individual answers are separated on the answer tapes, and the tapes are visually coded to facilitate the individual retrieval of any particular answer.

A lecture map is provided, on which there is an outline of the topics of the lecture, together with addresses in the form of instructions as to where in the lecture cassettes a particular topic may be found. Adjacent the entries on the lecture map identifying the various points of the lecture are indications of questions which the lecture may raise, together with addresses in the form of instructions for obtaining a selected answer from the answer tapes.

I have chosen the term "interactive lecture" to describe the lecture recordings, answer recordings, and map prepared and produced in the foregoing manner.

A tape recorder and a graphic recorder, such as an Electrowriter receiver, are provided to the student. Typically, he will then place the first lecture tape on the recorder, and begin to listen to it. He may continue to listen until he has gone through the entire lecture, but, due to the interaction permitted by the recordings, experience has shown it to be very unlikely he will do this.

At any time that the user desires, he may stop the lecture, and simply pause for thought. Alternatively, he may repeat a selected portion of the lecture if he finds he has not caught the thought. With the lecture map before him, as he listens to the lecture, he can look over the questions which may suggest themselves, and at any point at which he would like the answer to such a question, he can stop the recorder and remove the lecture tape. An important facility is that of removing the tape from the recorder without disturbing it in position.

Next, he selects the appropriate answer from the answer tape cassettes, and places them on the recorder for playing back. He can then listen to a more or less extensive answer to the question provided, accompanied if desired with sketches or other written material prepared by the lecturer. He can proceed from there to hear the answers to other questions, or return to the lecture. Since it was not necessary to change the position of the lecture tape, the user can go directly back to the place where he left off in the lecture, and thus resume it without losing his place.

Experience has shown that students voluntarily consume relatively long periods of attentive time in this process, up to several hours, either listening to the lecture, thinking about what they have heard, repeating selected portions, or going off into answer material. Sometimes, they will ask a question well out of context in the lecture. This individual choice can be accommodated without difficulty because all of the answers are equally available even though their use in a particular sequence is suggested by the lecture map.

The student thus has presented to him a large number of different approaches to the recorded material, from which he can select at will in accordance with his immediate interests and concerns. It has been found that the interaction thus provided between the student and the recorded material stimulates the interest and thus facilitates the comprehension of the student.

The manner in which interactive communication material is prepared in accordance with the invention, its use in the practice of the invention, and the apparatus for using it to produce an interactive communication situation, will best be understood in the light of the following detailed description, together with the accompanying drawings, which together illustrate the invention in various of its exemplary embodiments.

Figure 1:
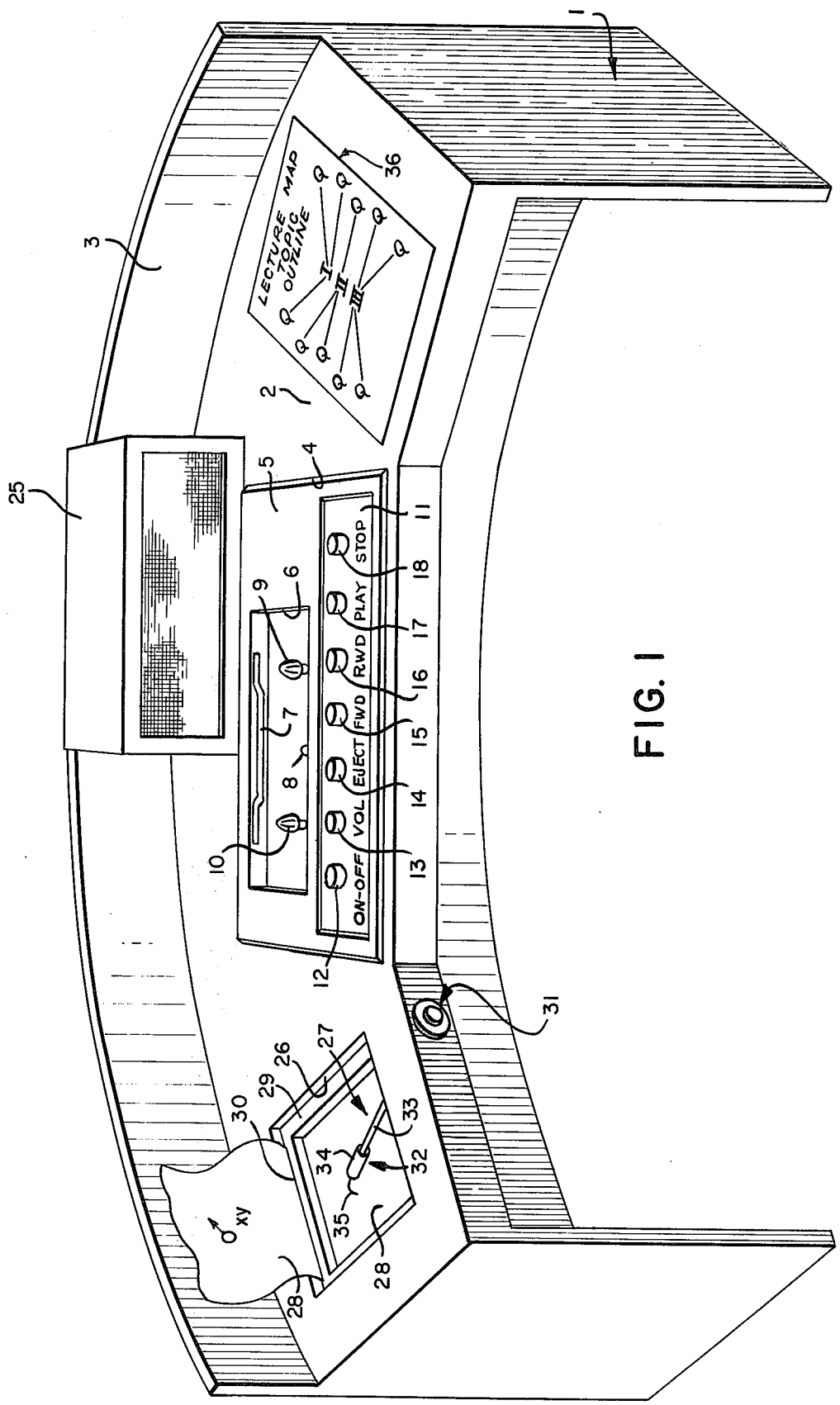
FIG. 1 is a schematic perspective sketch of a learning machine in accordance with the invention.
Figure 6:
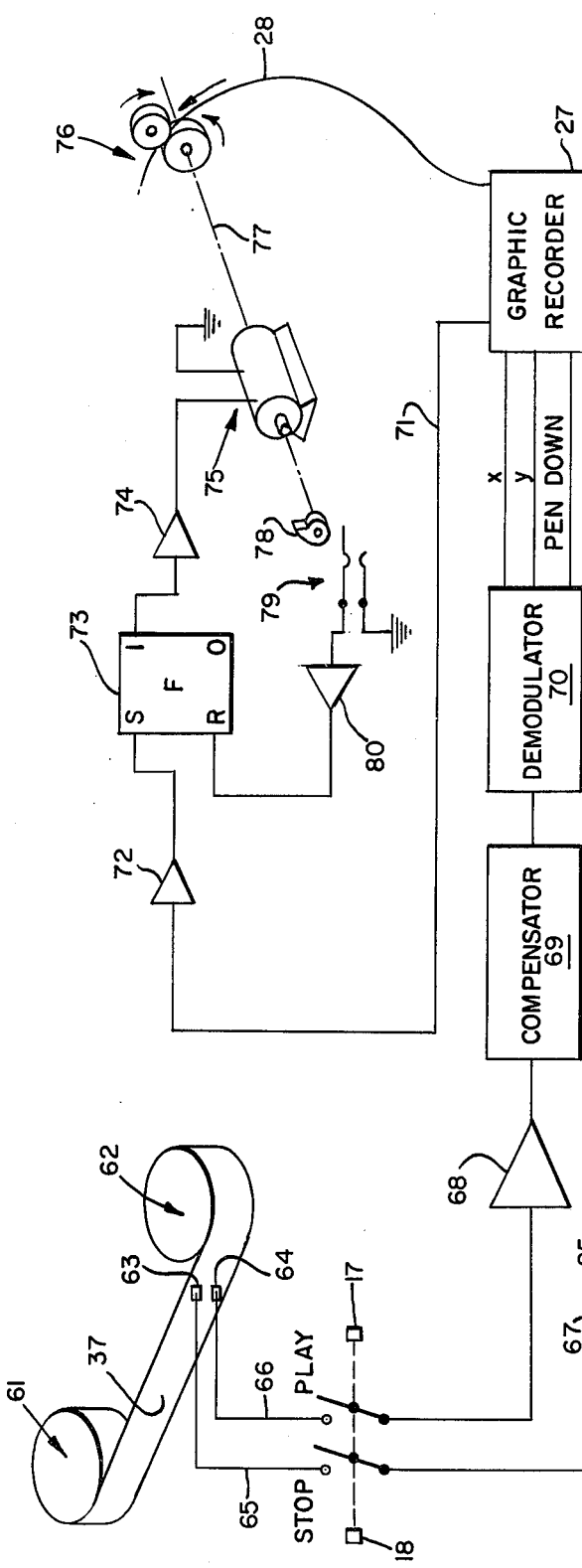
FIG. 6 is a schematic block and wiring diagram of the recording and reproducing apparatus of the system of FIG. 1.
Figure 8:
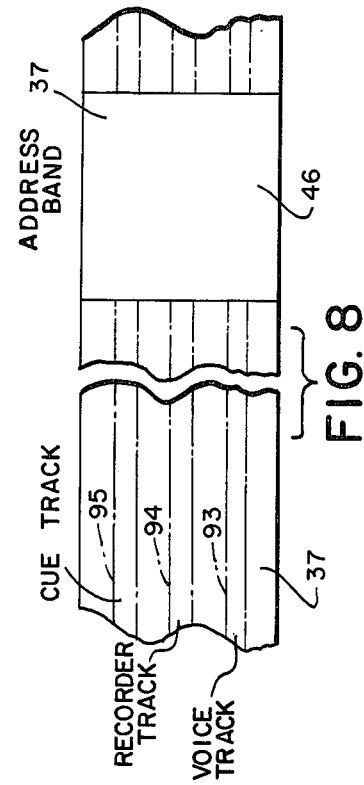
Figure 9:
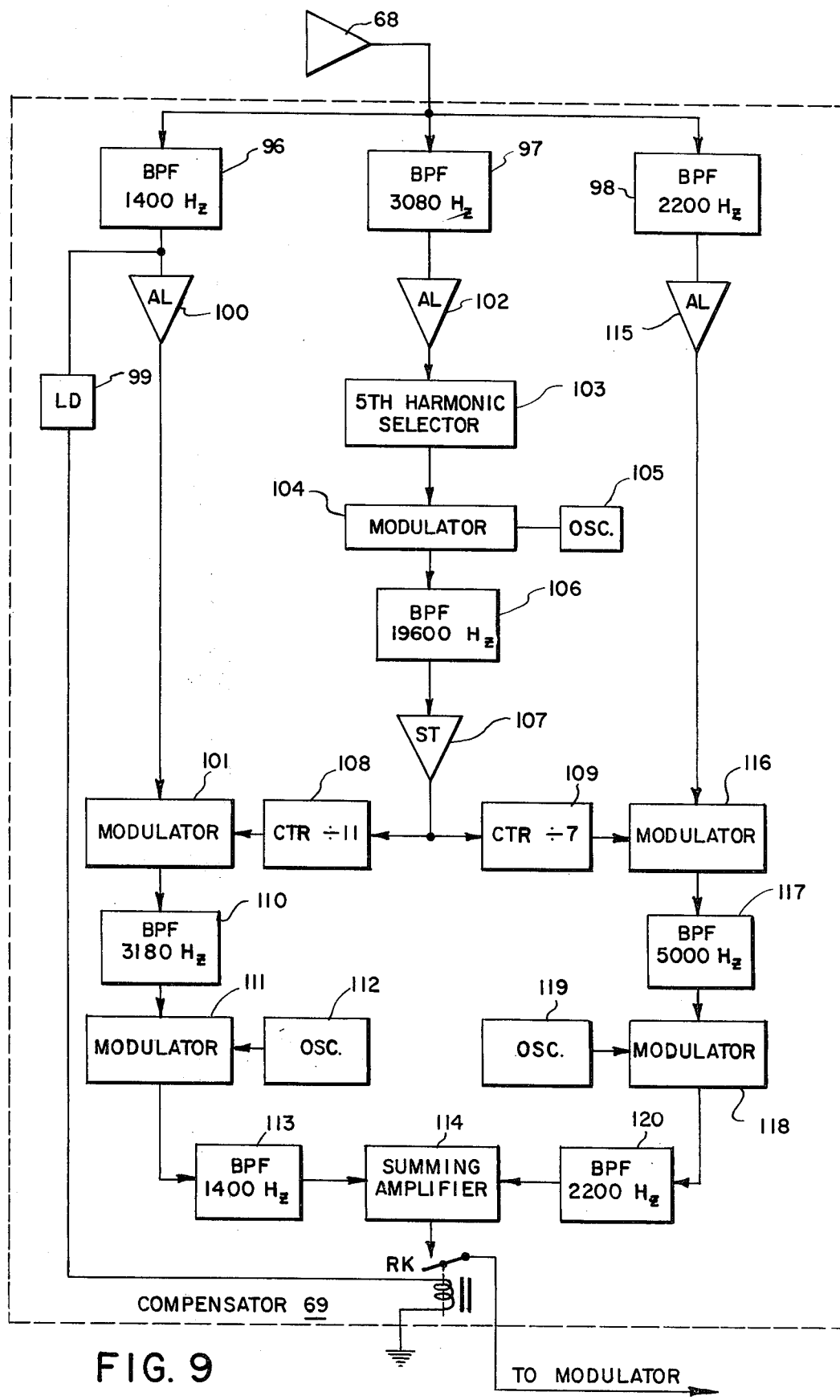

FIG. 8 is a fragmentary plan sketch, with parts broken away, illustrating schematically the location of various items of information on a tape used in recording material for use in the system of FIG. 1; and FIG. 9 is a schematic block and wiring diagram of a compensator useful in the system of FIGS. 1 and 6 to eliminate the effects of recorder wow and flutter on pen position signals recorded to control the position of the pen in a graphic recorder forming a part of the apparatus of FIGS. 1 and 6.

Referring to FIG. 1, the apparatus provided to the student or other user of the communication system of my invention may conveniently comprise a desk generally designated 1 having a top forming a console 2 that may be surrounded by a lip as suggested at 3 to prevent miscellaneous objects from rolling behind the desk. On the console 2 are assembled elements with which the student interacts to communicate with the lecturer, and, more indirectly, with those who have assisted the lecturer in assembling the question and answer material provided.

A generally rectangular locating recess 4, in the form of a well in the console 2, is provided to accept a conventional tape recorder 5. The recorder 5 is preferably of the well-known and widely available type that accepts cassettes of magnetic tape. Each such cassette is provided with four tracks, accessible two at a time by reversing the cassette.

For this purpose, the recorder 5 is provided with a well 6 formed to receive the cassette. In the well 6 is a spring suggested at 7 which is stressed by the cassette when inserted, and which serves to aid in ejecting the cassette.

As the cassette is inserted, a resiliently biased latch 8 is moved aside. The latch 8 holds the cassette in position during manipulation of the tape by the recorder. A drive sprocket 9 extends up from the bottom of the well 6 for engagement with the supply reel of the cassette, and a drive sprocket 10 extends upwardly for engagement with the takeup reel of the cassette, all in a conventional manner.

The recorder 5 may be provided with a control panel 11 on which appear conventional controls, including an on-off switch 12, and a volume control knob 13 for adjusting the playback volume, so that the sound produced by a conventional loudspeaker 25 to which the recorder 5 is connected in a conventional manner can be controlled to meet the requirements of the user.

An eject pushbutton 14 is provided which is arranged in a conventional manner to release the latch 8. That allows the cassette to be ejected under the force of the spring 7 to a convenient position for retrieval by the user.

A forward pushbutton 15 is provided which, when depressed, will cause the tape in the cassette to be advanced rapidly onto the takeup reel until the pushbutton is released. Similarly, a rewind button 16 is provided which, when depressed, causes the tape to be rapidly advanced onto the supply reel until the pushbutton is released.

A pushbutton 17 is provided which, when momentarily depressed, will cause the recorder to play a tape in a cassette in position in the well 6. The tape will be played from its position when the button is depressed to the end of the tape, or until a stop button 18 is depressed, which causes the apparatus to stop and await a further signal.

A recess 26 in the console 2 accepts a graphic recorder generally designated 27, which may be an Electrowriter receiver of the type described above, or any other conventional form of graphic chart recorder which can respond to recorded signals by reproducing handwritten material such as words, phrases, formulae, sketches or the like. For this purpose, the recorder 27 is provided with a supply of paper in the form of a strip 28 which extends through a writing space defined by a frame 29 forming a part of the recorder 27, and thence through an outlet slot 30 for disposal as it is used and moved to provide a fresh writing surface.

If desired, a conventional pushbutton 31 may be disposed on the front of the desk 1 for access by the user to supply a signal to the recorder 27 to cause it to advance paper to a fresh writing position. Alternatively, and in the usual case, automatic signals will be provided to the recorder to cause it to advance as the lecturer has determined would be desirable to provide a fresh writing surface during the course of his presentation of either a lecture or an answer. As supplied to the purchaser, the Victor Electrowriter facsimile receiver is provided with means for either manually advancing paper, or for advancing the paper automatically in response to automatic movement of a recording stylus 32 to a prescribed corner of the frame 29.

The stylus 32 is provided with an arm 33 automatically positioned in response to signals supplied by the tape recorder 5 in a manner to be described below, and has a head 34 carrying a pen nib 35 to which ink is supplied for the purpose of writing on the paper 28 when the stylus 32 is moved about the paper. The stylus 32 has a home position which is assumed when it is not in use, with the pen off the paper, and it is supplied with a "pen down" signal to cause it, once it has been moved into writing position, to make contact with the paper when directed.

Associated with each lecture and answer series, and supplied for use with the apparatus of FIG. 1, is a lecture map schematically indicated at 36. As suggested in FIG. 1, the lecture map provides indicia indicating the topic of the lecture, and under that an outline of the lecture on which phrases identifying selected portions of the lecture appear. Associated with each of these lecture topics may be questions written out on the lecture map, any of which may be selected by the user, when desired, for answering by reference to the recorded material on the answer tape, to be described. The tape recorder 5 and graphic recorder 27 are thus used in conjunction with the lecture map to allow the user to select his path through the available material.

Figure 2:
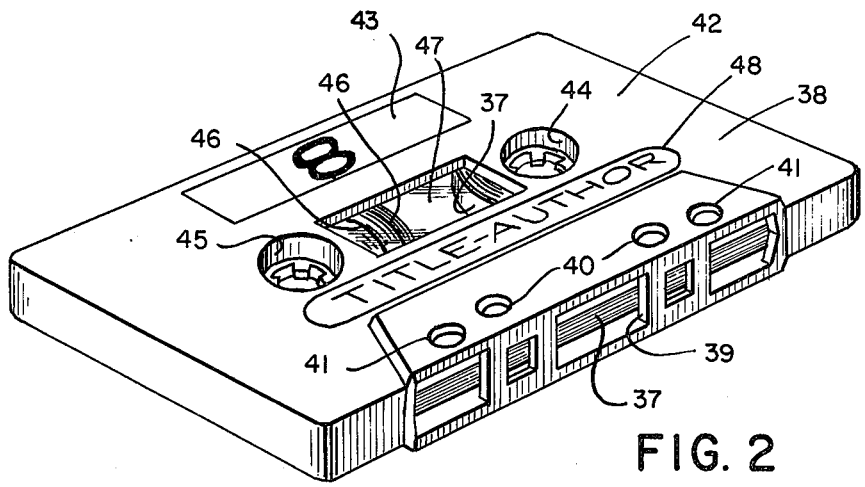
FIG. 2 is a schematic perspective sketch of a cassette suitable for use in the apparatus of FIG. 1.

FIG. 2 shows a typical cassette adapted for use in the system of FIG. 1. The cassette may be of the conventional form such as produced by the North American Philips Corporation under the name "Philips Compact Cassette", or other cassettes manufactured to the same specifications by other suppliers.

The cassette contains a pair of reels on which a strip of magnetic tape 37 is disposed. The tape and its supply and takeup reels are disposed in a housing 38 provided with a playback aperture such as 39 adapted to allow a set of playback heads to engage the tape 37 to reproduce recordings thereon. Ports are provided as at 40 to accept locating pins in the recorder 5, and ports such as 41 are provided to accept a drive capstan, in one or the other of the ports 41 depending on whether the cassette is placed with a side 42 of the housing downward in the recorder well 6, or whether that side is placed upward. That allows the tape to be played in both directions, with two tracks of the four available being played in each direction of movement of the tape. The cassette 38 may be provided with a panel 43 in which a number, such as 8 in FIG. 2, may be inscribed to designate the side of the cassette as a particular one in an ordered series of recordings for addressing purposes. An opening 44 in the cassette housing accepts one or the other of the drive sprockets 9 and 10 in FIG. 1, depending on the orientation of the cassette, and an opening 45 accepts the other of the drive sprockets 9 and 10. Thus, depending on the orientation of the cassette in the well 6, one reel serves as a takeup reel and the other serves as a supply reel. If desired, only one side of the cassette may be employed, for simplicity in accessing, and in that case, the reel driven through the recess 44 may be considered the supply reel and the other reel accessed through the recess 45 may be considered the takeup reel.

The rolls of tape inside the cassette 38 are marked at intervals by distinctively colored bands such as 46. The bands 46 may be white, black, red, yellow or any other color that serves to distinguish them from the usual brown color of the magnetic oxide coated tape. These bands may be counted from the center of the takeup reel, and are visible through a conventional window 47 provided in the wall such as 42 of the cassette. Thus, the bands may be numbered by counting outwardly from the center of the takeup reel, for example, and the entry points into the tape thus provided may be termed bands 1, 2, 3, etc., for access purposes.

If both sides of the tape are used, these distinctive bands 46 will extend only along the edges of one side of the tape, or, for example, halfway through the tape, so that they may be differently disposed on different sides of the tape if both sides are used. That matter of choice will be sufficiently apparent; for simplicity, the further aspects of the invention will be described on the assumption that only one side of the tape is used for each cassette.

The cassettes such as 38 may be provided with an additional panel 48 on which the title and author, for example, of the lecture and answer material may be displayed. Conveniently, a number of the cassettes 38 corresponding to one lecture and answer series may be disposed in an album comprising a box 49 having compartments such as 50 to accept a set of the cassettes, labelled as suggested in FIG. 3 from 1 through 9. A cover 51 hinged to the box 49 may be provided with a fastener 52 cooperating with a similar fastener 53 on a side of the box 49, so that the set of lecture and answer material can be handled as a closed package and filed in a library in the manner of a book. As indicated in FIG. 3, the title and author of the material can also be inscribed on the outside of the box 49 to facilitate filing and retrieval in this manner.

Figure 4:
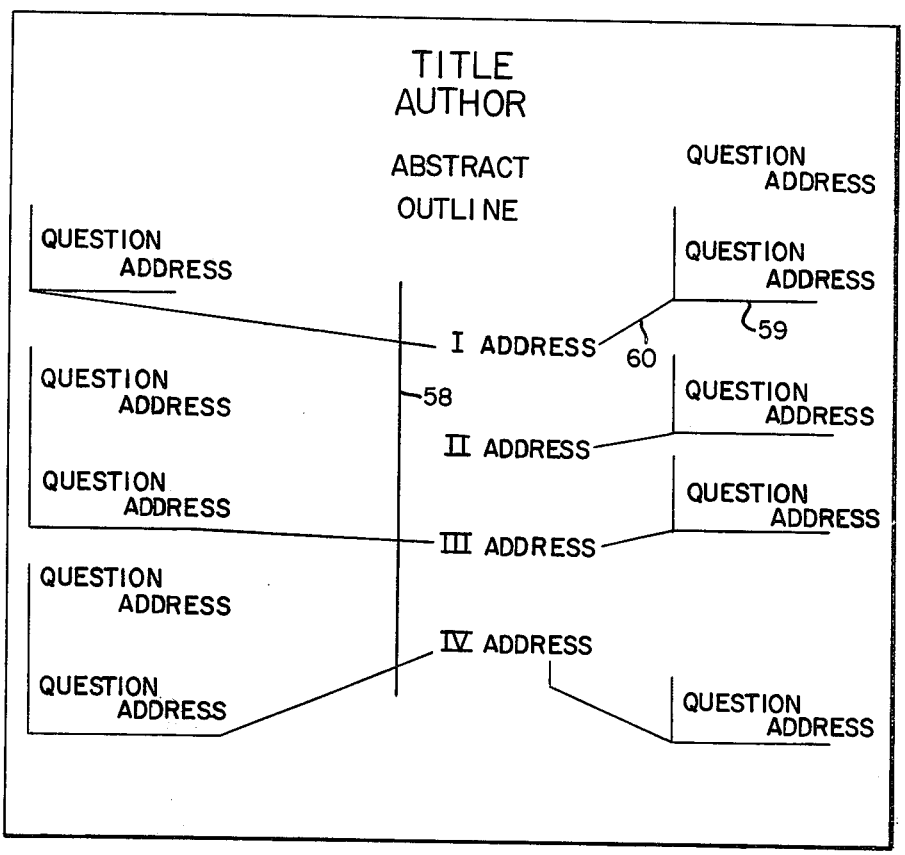
FIG. 4 is a schematic diagram of a lecture map in accordance with the invention.
Figure 5:
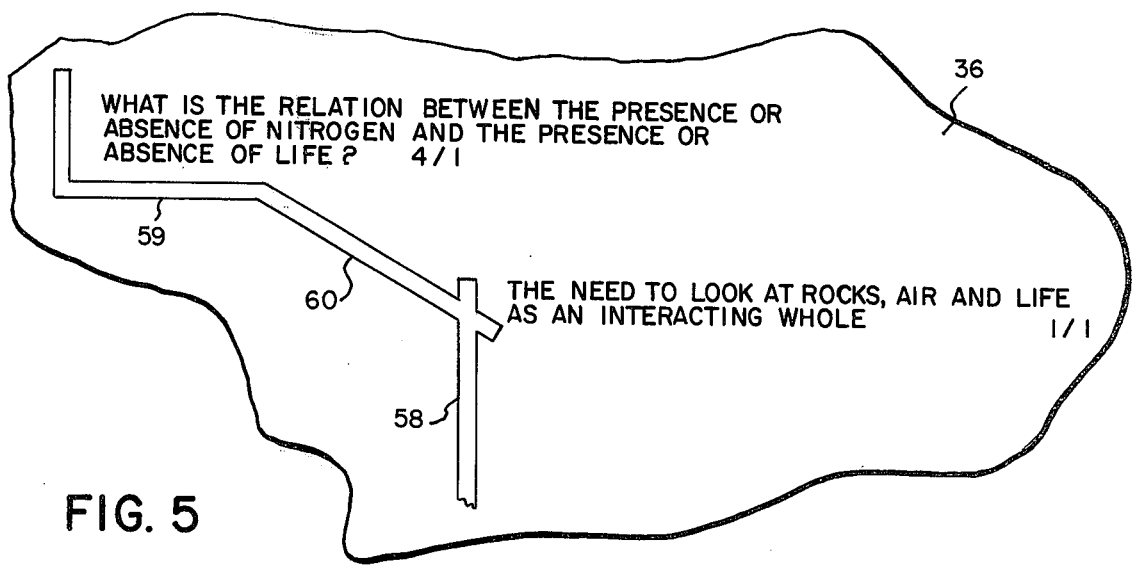
FIG. 5 is a fragmentary plan sketch of a portion of a particular lecture map in accordance with the basic scheme illustrated in FIG. 4.

FIGS. 4 and 5 show features of the lecture map 36 of FIG. 1 in progressively more detail. As indicated in FIG. 4, each point in the lecture outline is associated with an address inscribed on the lecture map adjacent the sentence or phrases that identify that topic.

Figure 3:
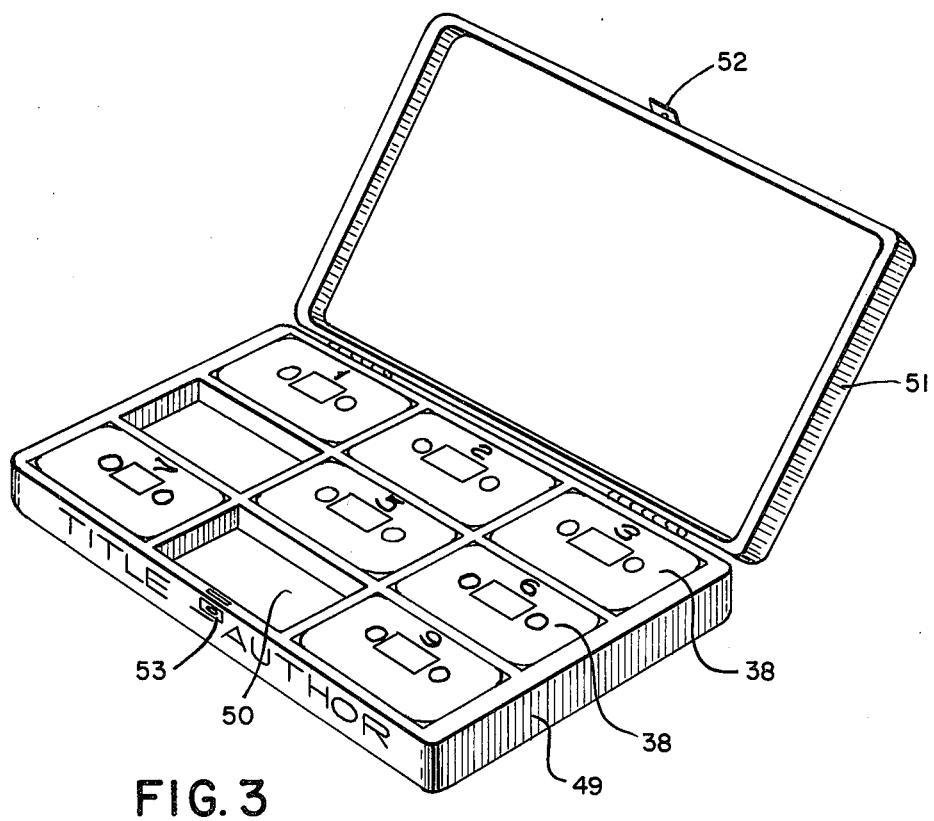
FIG. 3 is a schematic perspective sketch of a lecture album suitable for use with the cassettes of FIG. 2 in the system of FIG. 1.

Referring to FIG. 3, the lecture material may, for example, occupy the first three cassettes labelled 1, 2 and 3 in the box 49. At convenient pauses in the lecture, colored bands such as 46 may be placed on the tape to more finely divide the addresses of the main points in the lecture within a given cassette.

For example, referring to FIG. 5, the first topic in a typical lecture is identified by the words "The need to look at rocks, air, and life as an interacting whole". The address 1/1 is inscribed on the lecture map 36 adjacent this topic identification. The significance of that address is that the material in question begins on cassette 1 at band 1, so that the first distinctive band 46, when wound onto the takeup reel, will be followed by the portion in question.

A designating line 58, as of a distinctive colored band or the like, may be inscribed on the lecture map to bound the lecture outline and set it off from the other material on the map 36. Associated with the various topics in the lecture outline are the several questions that have been selected for inscribing on the map that the student may desire answers to. These are set off by brackets for each group of one or more questions, such as the bracket 59, and led to the outline topics by distinctively colored lead lines such as 60 that associate the questions with the lecture topics.

As shown in FIG. 4, each question bears its own address in the file of material. For example, as shown in FIG. 5, the question "What is the relation between the presence or absence of nitrogen and the presence or absence of life?" is associated with lecture topic 1. This question has the address 4/1, which means that it is to be found in cassette 4 at band 1. The address 4/5, for example, would mean that the desired material would be located in cassette 4 just beyond the point at which the fifth distinctive band 46 had been wound onto the takeup reel.

FIG. 6 illustrates the essential aspects of the control apparatus required in the recorder 5 to make use of recorded tapes in the communication system of the invention. The tape 37 is shown very schematically as disposed between a takeup reel 61 and a supply reel 62 for movement past two playback heads 63 and 64. Additional heads may be provided to cooperate with other tracks on the tape 37, for purposes to appear.

The heads 63 and 64 may be connected to leads 65 and 66, respectively, thence through the separate armatures of a ganged double pole, double throw switch S2 to suitable amplifiers 67 and 68, respectively. The switch S1 may close circuits from the heads to the amplifiers when the play pushbutton 17 is depressed, and open these circuits when a stop pushbutton 18 in FIG. 1 is depressed.

The amplifier 67 may be a conventional audio amplifier, having a gain controllable by the volume control knob 13 in FIG. 1. The amplifier 67 supplies an output signal to the loudspeaker schematically indicated at 25 in FIG. 6.

The amplifier 68 may be a conventional amplifier having an output connected to a compensator 69 with which the effects of wow and playback in the recorded Electrowriter signals can be reduced. Without such compensation, I have found that even very high quality tape recorders produce so much wow and flutter that the recorded Electrowriter signals cannot be properly reproduced. The reason is that the position signals for the recording pen arm 33 are in the form of frequency modulated carrier signals, with the modulation band being below 200 cycles per second. For example, a typical carrier may be at 1400 cycles plus or minus 90 cycles per second, depending on the pen position about a particular axis. These fluctuations are in the band in which wow and flutter can be expected to occur most prominently, i.e., in the band between zero and 120 cycles per second. Thus, unless compensation is applied, even minor amounts of flutter can significantly disturb the signals. However, a compensator of the type to be described below, effectively reduces this sort of distortion well below an acceptable outer limit.

The output signals from the compensator 69 are applied to a conventional demodulator 70 which takes the frequency modulated signals from the compensator and transforms them into $x$, $y$ and pen down signals for the recorder 27. The $x$ and $y$ signals govern the orthogonal coordinates of the position of the stylus 32 on the portion of the paper 28 within the frame 29 in FIG. 1, and the pen down signal, when present, moves the pen 35 into contact with the paper 28 so that the paper can be written upon.

The $x$ signal may be recorded as a variation within plus or minus 90 cycles of a 1400 cycle tone. The $y$ signal may be recorded as a variation within plus or minus 140 cycles of a 2200 cycle tone. The pen down signal can be recorded as a steady 120 cycle per second frequency variation superimposed on either one or the other of the modulating carriers. The pen down signal does not disturb the other signals, because it is at such a high frequency that the pen will not follow it. A pilot signal having a fixed frequency of, for example, 3080 Hz, is preferably recorded with the position signals, for use in the compensator in a manner to be described.

As noted above, the Electrowriter facsimile receiver provides a switch closure when the stylus 32 is moved to bring the pen 35 to a predetermined corner of the writing frame 29. When this occurs, a signal appears on a lead 71 that is supplied to an amplifier 72 to produce a suitable pulse for setting a conventional flip flop 73.

When set, the flip flop 73 provides a suitable voltage level at its logic 1 output terminal that is applied to an amplifier 74 to cause it to produce drive current for a conventional paper feed motor 75. The motor 75 operates conventional drive rollers 76 to advance the paper 28 by a sufficient distance to produce one fresh paper frame. The drive shaft 77 of the motor, connected to the drive rolls 76 through suitable gearing, is also suitably geared to a cam schematically indicated at 78 which momentarily closes a switch 79 after one revolution of the shaft 77 to cause an amplifier 80 to reset the flip flop 73.

Figure 7:
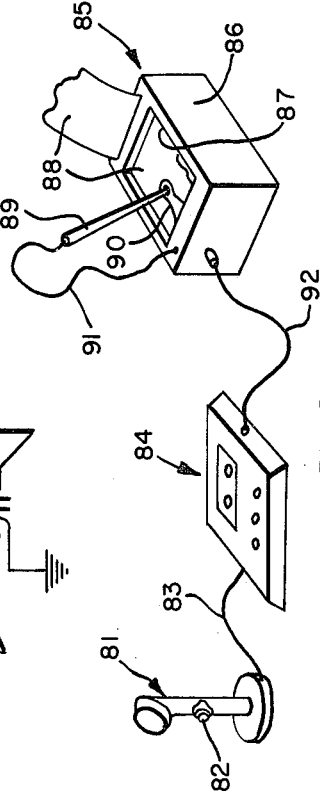
FIG. 7 is a schematic perspective sketch of apparatus used in preparing lecture and answer material in accordance with the invention.

FIG. 7 shows the apparatus necessary to produce recorded lecture and answer material in accordance with the invention. Basically, this apparatus comprises means for making original recordings, from which the final recordings can be edited by conventional methods for incorporation in the cassettes to be included in the album of FIG. 3.

The apparatus essentially comprises a microphone schematically indicated at 81, preferably provided with a conventional pushbutton such as 82 to provide a switching signal, carried with the audio signal from the microphone 81 over a cable 83 to a conventional tape recorder 84 with which recordings can be made. The apparatus is arranged in a conventional manner, such that pushing the button 82 will enable the recorder 84 to begin recording a voice picked up by the microphone 81.

A graphic recording transmitter generally designated 85 is preferably also associated with the recorder 84. The transmitter 85 may be a conventional Electrowriter transmitter of the type referred to above. Basically, such a transmitter comprises a housing 86 provided with means forming a frame 87 in which a portion of a strip of paper 88 is displayed to form a writing frame.

A pen 89 is adapted to be inserted into a follower 90. The follower 90 may be connected to a pair of ferromagnetic elements movable along generally orthogonal axes to vary the frequency of a pair of oscillators in aaccordance with the x and y coordinates of the position of the pen 89 on the paper 88. The follower 90 may also be connected to means for operating a switch when the pen 89 is movable to a predetermined corner of the recording frame, to produce a signal that will advance the paper 88 to provide a fresh writing surface.

The pen 89 is connected to the housing 86 over a flexible cable 91. The cable 91 serves to keep the pen 89 in the vicinity of the recorder, and also serves to carry an electrical switching signal provided by a microswitch in the housing of the pen 89 to supply a pen down signal for recording with the position signals when the pen 89 is picked up and the end inserted in the follower 90. Signals produced by the transmitter 85 are supplied to the recorder 84 over a suitable cable 92. A local oscillator is preferably provided in the transmitter to supply a pilot signal at a frequency fp of, for example, 3080Hz. This signal is recorded on one track of the tape 37 in superposition with the carrier signals for the $x$ and $y$ axis positions of the recording stylus.

In producing recorded lecture and answer material for use in accordance with the invention, the apparatus of FIG. 7 may be placed on a desk at which the lecturer is seated, so that he can initiate the recording of his voice by pushing the button 82 and speaking into the microphone 81. At any time during the course of the lecture or answer that he is giving, he can illustrate his remarks with the pen 89 to record corresponding signals on the tape.

FIG. 8 illustrates one manner in which the tape 37 can be utilized for the purposes of the invention. The tape 37 may be a conventional Mylar base tape on which a magnetic oxide coating is provided. A pair of sufficiently spaced tracks 93 and 94 are assigned for recording the voice and graphic recorder signals from the transmitter 85, respectively. If desired, another track 95 may be assigned for recording various cueing functions, such as signals for activating a random access slide projector or the like, to show slides illustrating portions of the lecture as it proceeds.

The address bands 46 may be painted, cemented, or spliced on the tape in pauses between paragraphs in the lecture, or in (preferably more widely spaced) separations between recorded answers. Alternatively, the bands 46 may be placed on the reverse side of the tape 37 in such a way as not to interfere with the recording of signals over them for the lecture. For answer material, it is desired to leave reasonably long spaces that will occupy at least several seconds in playing, so that the answers will not be confused with each other.

A compensator 69 suitable for use in the apparatus of FIG. 6 will next be described in connection with FIG. 9. The compensator to be described is more fully shown and described in copending U.S. application for Letters Patent, Ser. No. 294,316, now U.S. Pat. No. 3,810,188, issued on May 7, 1974, filed at the same time as this application by T. A. O. Gross and Stewart W. Wilson for Frequency Deviation Compensation System and assigned to the assignee of this application.

The compensator 69 receives the output signal from the amplifier 68 which has been reproduced from a recording, on either an answer or a lecture tape, in the manner described above. The output signal from the amplifier 68 is applied to three band pass filters 96, 97 and 98.

The filter 96 is designed to pass signals at the 1400 Hz carrier frequency $f_1$ for the $x$ axis signal and its accompanying frequency modulations $\pm \Delta f_{1i}$, together with enough pass bandwidth to take care of the maximum excursion frequency that is expected to occur because of variations in recording and playback speed due to wow and flutter. The frequency of the output signal from the filter 96 may be expressed as $f_1 \pm \Delta f_{1n}$, where $\Delta f_{1n}$ is the noise frequency deviation introduced by wow and flutter.

The filter 97 is designed to pass signals at the pilot frequency $fp$ of 3080 Hz, together with the expected variations $\pm \Delta fpn$ in that frequency due to noise. This frequency can be expressed as $fp \pm \Delta fpn$.

The filter 98 is designed to pass signals at the carrier frequency $f_2$ of 2200 Hz for the $y$ axis signal, together with its modulation $\pm \Delta f_{2i}$ and the fluctuations $\pm \Delta f_{1n}$ due to speed variations. The output signal from this filter may be expressed as $f_2 \pm \Delta f_{2i} \pm \Delta f_{2n}$.

The noise frequency components of the signals produced by the filters 96, 97, and 98 will be proportional to the carrier frequencies. Since the only deviation from the pilot frequency is due to noise, that deviation is employed in the apparatus to be described to eliminate the noise components from the information signals produced by the filters 96 and 98.

The output signal from any of the filters, but in the embodiment here shown, the filter 96 is applied to a level detector 99 which produces energizing current for the winding 121 of a relay RK when the carrier signal from the filter 96 is present above a predetermined level. The relay RK closes contacts 122 to supply the output signal from the compensator to the demodulator 57 in FIG. 4. The relay is introduced in order to prevent noise from causing the pen to move about in a random fashion when no command signal is present.

The output signal from the filter 96 is also applied to the input terminal of an amplifier limiter 100. The amplifier limiter 100 produces an output signal that includes the frequency content of the input signal and is limited to a fixed amplitude. This signal is supplied to a conventional modulator 101, where it is modulated with a 1780 Hz signal shifted by the noise frequency and obtained from the pilot signal in a manner next to be described.

The output signal from the band pass filter 97 is applied to an amplifier limiter 102, which produces an output signal having a fixed amplitude and the frequency content of the input signal, which as it will be recalled is 3080Hz shifted by the deviations due to wow and flutter. This output signal is applied to a harmonic selector 103, which selects and passes the 5th harmonic, or 15,400 cycles, plus or minus five times the noise content. This signal may be expressed, as to its frequency content, by the expression $5fp \pm 5\Delta fpn$. This signal is supplied to a modulator 104 of any conventional construction, where it is modulated by a 35,000 Hz signal from a local oscillator 105.

The modulator 104 may be a conventional mixer, but is preferably of the type in which the input signal, here 15,400 shifted by the noise deviations, is chopped by an electronic switch at a rate determined by the 35,000 Hz reference frequency. The output signal of the modulator 104 contains a number of modulation products, including sum and difference frequencies centered at 50,400 Hz and 19,600 Hz, respectively.

Either of these signals may be used for noise compensation purposes, but in the illustrated embodiment the difference signal centered at 19,600 Hz is selected by a band pass filter 106. The output signal from the filter 106 may be expressed as 19,600 Hz $\pm 5\Delta fpn$.

This signal is supplied from the band pass filter 106 to a Schmitt trigger circuit 107 which produces a square wave at the fundamental frequency of 19,600 Hz $\pm 5\Delta fpn$. The signal from the Schmitt trigger 107 is applied to the counting input terminals of two binary counters 108 and 109.

The counter 108 may be of conventional construction, except that it is arranged to count in normal ascending binary sequence to decimal 11, and then to recycle, through suitable conventional gates provided, to produce a carry signal at each 11th count and reset to 0 to begin again. The output signal from the counter 108 is thus a square wave at a fundamental frequency of $19,600/_{11} \mp (5/11)\Delta fpn$, or $1780 \mp (5/11)\Delta fpn$. It should be noted that the sign of the noise component is inverted by reason of the difference signal taken from the output of the modulator 104 by the band pass filter 106. Wow and flutter in recording and playback will affect the frequency of a recorded signal in proportion to its frequency; furthermore, the carrier frequency of 1400 Hz is 5/11 of the pilot frequency of 3080 Hz. Accordingly, the signal $\pm \Delta f_{1n}$ is equal in frequency but opposite in sign to the signal component $\mp(5/11)\Delta fpn$.

The signal from the counter 108 is used to modulate the information signal from the amplifier 100 in the modulator 101. This modulator may also be of any conventional design, but as for other modulators to be described, it is preferably of the type in which the input frequency from the amplifier 100 is chopped by the reference frequency from the counter 108.

The output signal from the modulator 101 includes both sum and difference frequencies. The sum frequency centered at 3180 Hz is selected by a band pass filter 110.

The components of the sum signal include the noise components in opposite senses, so that they cancel. The output signal from the filter 110 may thus be expressed as $3180 \pm \Delta f_{1i}$. This signal is applied to a conventional modulator 111, of the type described above, in which it is modulated with a fixed 1780 Hz reference frequency from a local oscillator 112. This local oscillator, and other local oscillators to be described, are preferably crystal controlled oscillators designed to maintain a constant relationship to the frequency of the oscillator 105.

The difference signal component of the modulation products produced by the modulator 111 is selected in a band pass filter 113 that produces an output signal at 1400 Hz $\pm \Delta f_{1i}$. This is the desired compensated $x$ axis frequency signal. It is applied to a summing amplifier 114 for application to the demodulator when the relay RK is energized.

The $y$ axis signal is compensated in a similar manner. The output from the band pass filter 98 is supplied to an amplifier limiter 115, where it is converted to a signal of fixed amplitude. The output signal from the amplifier limiter 115 has a frequency content that may be expressed as $f_2 \pm \Delta f_{2i} \pm \Delta f_{2n}$. This signal is applied to a modulator 116, where it is modulated by the output signal from the binary counter 109. The counter 109 is arranged to produce a carry pulse every 7th pulse supplied to the input, so that its output may be expressed as $19,600/7 \mp (5/7)\Delta fpn$.

The $y$ axis carrier frequency of 2200 Hz is equal to 5/7 of the pilot frequency 3080 Hz. Thus, the noise component in the signal from the counter 109 is opposite in sign and equal in magnitude to the noise component of the signal from the amplifier 115.

The sum signal from the modulator 116 is selected by a band pass filter 117. The selected signal thus has a frequency of 5,000 Hz $\pm \Delta f_{2i}$, since the noise components have been cancelled in the summing process. This signal is applied to a modulator 118, where it is modulated by the output signal from a local oscillator 119 that produces a fixed frequency of 2800 Hz.

The difference signal from the modulator 118 is selected by a band pass filter 120, which thus produces an output signal at $2200\pm\Delta f_{2i}$, or the desired compensated $y$ axis signal. This signal is supplied to the summing amplifier 114 and thence to the demodulator when the relay RK is energized.

It will be apparent that the methods and apparatus described above provide the means for an interactive communication process capable of flexible employment by the user to obtain information at his own pace and in a manner suited to his immediate interest and needs. The services of talented individuals can be made available to others widely separated in space or time, for use at the convenience of the user. In practice, a number of chambers can be provided with consoles such as that shown in FIG. 1, and a library of lectures and answers in the form of albums such as that shown in FIG. 3 can be made available so that a student can come in at a time of his own choosing, select an album and sit down at an available console and proceed to employ the cassettes in the album, under the general guidance of the lecture map provided with the album, to interact with the recorded material in a manner approximating that which he could employ if the lecturer were there in person, except that the lecturer's personality does not dominate the process and the student is free to devote as much or as little time as he desires to any particular point. The methods and apparatus here described can be used alone, or in conjunction with conventional educational methods such as self-study, classroom discussion, or other conventional group educational methods.

The methods and apparatus of the invention are well adapted to use by the blind, if the indicia employed are made perceptible by the sense of touch, rather than by the sense of sight. In particular, the indicia on the cassettes which identify them, and the legends on the lecture map, could readily be formed in braille. The identifying bands on both lecture and answer tapes may be made of tactually perceptible thickness for the same purpose, or formed as holes or notches in the tape. The graphic recorder may be modified to engrave upon a relatively thick waxed paper surface, if it is desired to include this form of accompaniment to the lecture in a system intended for use by a blind user.

While the invention has been described with respect to particular details of preferred embodiments, many changes and variations will occur to those skilled in the art upon reading this description, and such can obviously be made without departing from the scope of the invention.

Having thus described the invention, what is claimed is:

1. A learning machine, comprising a first sound recording on which a lecture is recorded, a second sound recording on which a set of answers to questions that may be raised by the lecture is recorded, means for selectively reproducing the lecture and answers from the records in any desired sequence, and a map on which there is perceptibly recorded an outline of the lecture, a set of questions to which the answers have been recorded, and, for each such question, indicia indicating a primary relevance to a particular topic of the lecture and indicia enabling the user to locate the answer on said second record, said questions and said outline being simultaneously perceptible so that the possible relevance of all questions is suggested whether or not the lecture topic of primary relevance is then being reproduced.

2. The apparatus of claim 1, further comprising indicia on said second sound recording correlated with said indicia on said map.

3. The apparatus of claim 2, in which said answers are recorded on said second sound recording in spaced sequential regions, and in which said indicia on said second sound recording is located in the spaces between said regions.

4. The apparatus of claim 1, in which said recorded lectures and answers comprise sound sequences accompanied by graphic displays, and in which said reproducing means comprises sound reproducing means for reproducing said sound sequences and a graphic recorder for reproducing said graphic displays.

5. In combination, a tape recorder, at least one cassette of magnetic tape on which there is a recorded lecture adapted to be reproduced on said recorder, at least a second cassette of magnetic tape on which a series of answers to predetermined questions are recorded in a series of spaced sequential regions, said tape in said second cassette being visually marked in the spaces between said regions to facilitate the location of an answer in said series, and a lecture map bearing simultaneously visible indicia identifying points in said lecture, indicia associating questions each answerable by an answer in said series with said points, and indicia associating each such question with the visual marking on said second tape to facilitate the location of the answer to the associated question.

6. In combination, a tape recorder adapted to reproduce signals recorded on at least two tracks on a tape, a graphic recorder adapted to respond to applied position signals to produce a graphic display, at least one tape having first and second tracks, a lecture recorded on said first track, at least one set of position signals representing a graphic display to accompany a portion of said lecture recorded on said second track adjacent the region on said first track on which said portion is recorded, at least a second tape and a third tape each having at least one track on which at least the answer to one question that may be raised by said lecture is recorded, a map bearing simultaneously visible indicia associating various points in said lecture with the questions to which said answers have been recorded and associating said questions with the particular one of said second tape and said third tape on which the corresponding answer is recorded, and means operatively connecting said tape recorder to said graphic recorder for applying position signals reproduced from a tape to said graphic recorder.

7. The apparatus of claim 6, in which there is a second track on said second tape on which there is recorded at least one set of position signals representing a graphic display to accompany a portion of at least one answer on said second tape, said position signals being recorded on said second tape adjacent the region on said first track on which said portion of said answer is recorded.

8. The apparatus of claim 6, in which a pilot signal at constant frequency is recorded on said second track simultaneously with said series of position signals, and in which said means operatively connecting said tape recorder to said graphic recorder comprises means controlled by said pilot signal and said series of position signals for compensating said position signals to reduce the effects of wow and flutter on the graphic display produced by the graphic recorder.

9. An interactive learning system, comprising reproducing means for reproducing signals recorded on a record, at least a first record on which a lecture is recorded, at least a second and a third record on each of which at least one answer to a question that may be raised by said lecture is recorded, identifying means on said second and said third records to identify the answers so that they can be selectively located and reproduced by said reproducing means, a lecture map on which an outline of points in said lecture is perceptibly recorded, those questions answered on said second and said third records being perceptibly recorded on said map in association with those recorded points on said map most relevant to each question, and means perceptibly recorded on said map adjacent each recorded question for locating the associated answer by reference to said identifying means on said second and said third records.

10. A learning system, comprising a tape recorder for reproducing at least two independent signals from a record, a graphic recorder responsive to an applied series of position signals to produce a graphic display, means for applying one of said signals from said tape recorder to said graphic recorder, a loudspeaker, means for applying the other of said signals from said tape recorder to said loudspeaker, at least a first record on which two independent signals are recorded, one of said signals on said first record comprising a lecture adapted to be reproduced by said loudspeaker and the other of said signals on said first record comprising at least one series corresponding to a graphic display accompanying a portion of said lecture and recorded on said first record in a location adjacent said portion of said lecture, at least a second and a third record on each of which two independent signals are recorded, one of said signals on each of said second and third records corresponding to an answer to a question that may be raised by said lecture and adapted to be reproduced by said loudspeaker and the other of said signals on each of said second and said third records comprising at least one series corresponding to a graphic display accompanying said answer and recorded on each of said second and said third records adjacent that answer, and means for associating the question to which the answers on said second and said third records are responsive with the one of said second and said third records on which the associated answers appear.

11. The apparatus of claim 10, in which said means for applying said signal to said graphic recorder comprises means for compensating the applied signal for frequency deviations occurring during the recording and reproducing process.

12. An interactive learning system, comprising a console, a cassette tape recorder mounted on said console, said tape recorder being of the type which will accept a tape cassette and selectively play the tape, stop the tape, move the tape backwards and forwards to locate a desired place on the tape, and eject the cassette without changing the position of the tape in the cassette, at least a first tape cassette on which is recorded a lecture, at least a second tape cassette on which there is recorded a spaced series of answers to questions that may occur to a listener to the lecture, means perceptibly coding said second cassette to facilitate the location of individual ones of said answers, and a lecture map on which there is perceptibly recorded an outline of points in the lecture, questions to which answers have been recorded, means associating the questions with the points of the lecture to which they are most relevant, and means associating each question with the perceptible coding on said second cassette to permit the location of the answer to each question for selective playback, all of said questions being simultaneously displayed to allow an association with any question at any time during the playing of the lecture recorded on said first tape cassette, whereby a user can listen to a portion of said lecture, interrupt the lecture to refer to the answer to a desired question, the selection of the question to be answered being guided but not forced by the indicia on said lecture map under the influence of the portion of the lecture tape being played, and then resume the lecture without losing the place at which it was interrupted.

13. An interactive learning system which answers questions raised by a student in connection with a lecture, said system comprising a record sheet, upon one side of which are perceptibly recorded: an outline of the lecture; groupings of written questions which the system is prepared to answer, the groupings each being connected by a line to the item in the outline corresponding to the part of the lecture in connection with which the questions in the grouping arise, the questions in each grouping being ordered in the order in which they tend to arise to a person listening to the related section of the lecture; and the questions bearing indicia for use in accessing the desired answer; a first audio record on which said lecture is recorded; a second audio record on which answers to said questions are recorded; and means for selectively audibly reproducing said lecture and answers from the records.

14. An interactive communication system with which an individual may approximate a learning conversation between himself and an expert person, the system comprising an audio lecture recording made by the expert person and focused on a specific topic; an audio answer recording comprising answers recorded by the expert to questions arising from the lecture recording; a map showing simultaneously the locations of lecture material, questions answered in the answer recordings, the locations in the answer recording of those answers, and indicating a direct relationship between each question and the most relevant portion of the lecture; and means for audibly reproducing and accessing selected portions of the lecture recording and selected answers.

15. An interactive learning system, comprising a receptacle, means forming a series of containers in said receptacle, a first set of records in one set of said containers, a second set of records in a second set of said containers, a lecture recorded on the records of said first set, a set of answers to questions that may be raised by said lecture recorded on the records of said second set, means for selectively reproducing the lecture and answers from said records in any desired sequence, and a map on one side of which there is perceptibly inscribed an outline of topics of the lecture, a set of questions to which the answers have been recorded, and, for each such question, indicia indicating a primary relevance to a particular topic of said lecture and indicia enabling the user to locate the answer on one of said second set of records.

16. In an interactive communication system, a first cassette comprising a housing, a strip of recording tape mounted in said housing for movement over a range of positions relative to a playback station in said housing, at least two recorded sound signals on said tape in spaced locations, means perceptibly coding the spaces between said locations to facilitate the location of each of said signals for selective playback, said signals comprising answers to a set of questions relevant to a lecture, and further comprising a second cassette, said second cassette comprising a second housing, a second strip of recording tape mounted in said second housing for movement over a range of positions relative to a playback station in said second housing, a recorded signal on said tape corresponding to said lecture, means for selectively reproducing said lecture and answers from said records, and a map on which there is inscribed for simultaneous display an outline of topics of the lecture, indicia identifying the set of questions to which answers are recorded on said first recited cassette, and, for each such question, indicia indicating a primary relevance to a particular topic in the lecture and indicia enabling the user to locate the answer on said tape in said first recited cassette.

* * * * *